United States Patent
Karnawat et al.

(10) Patent No.: US 11,681,566 B2
(45) Date of Patent: Jun. 20, 2023

(54) LOAD BALANCING AND FAULT TOLERANT SERVICE IN A DISTRIBUTED DATA SYSTEM

(71) Applicant: NetApp Inc., San Jose, CA (US)

(72) Inventors: Rakshit Karnawat, Bangalore (IN); Veena Ts, Bangalore (IN); Ganesh Marappa, Bangalore (IN)

(73) Assignee: NetApp, Inc., San Jose, CA (US)

( * ) Notice: Subject to any disclaimer, the term of this patent is extended or adjusted under 35 U.S.C. 154(b) by 4 days.

(21) Appl. No.: 17/391,122

(22) Filed: Aug. 2, 2021

(65) Prior Publication Data

US 2021/0357270 A1 Nov. 18, 2021

Related U.S. Application Data

(63) Continuation of application No. 16/690,860, filed on Nov. 21, 2019, now Pat. No. 11,080,100, which is a continuation of application No. 15/727,713, filed on Oct. 9, 2017, now Pat. No. 10,521,276, which is a continuation of application No. 14/620,591, filed on Feb. 12, 2015, now Pat. No. 9,785,480.

(51) Int. Cl.
| | |
|---|---|
| *G06F 11/07* | (2006.01) |
| *G06F 9/50* | (2006.01) |
| *G06F 11/14* | (2006.01) |
| *G06F 11/20* | (2006.01) |
| *G06F 11/34* | (2006.01) |

(52) U.S. Cl.
CPC ........ *G06F 9/5088* (2013.01); *G06F 11/1425* (2013.01); *G06F 11/1484* (2013.01); *G06F 11/2035* (2013.01); *G06F 11/203* (2013.01); *G06F 11/3433* (2013.01); *G06F 2201/805* (2013.01)

(58) Field of Classification Search
CPC ............. G06F 11/1425; G06F 11/1484; G06F 11/203; G06F 11/2035; G06F 11/3433
USPC ...................... 714/3, 4.11, 4.2, 6.2
See application file for complete search history.

(56) References Cited

U.S. PATENT DOCUMENTS

| | | | |
|---|---|---|---|
| 7,076,691 B1 | 7/2006 | Dobberpuhl et al. |
| 7,590,985 B1 | 9/2009 | Nguyen |
| 8,255,425 B1 | 8/2012 | Li et al. |
| 9,329,937 B1 | 5/2016 | Grant et al. |
| 9,672,122 B1 | 6/2017 | Gandhi et al. |

(Continued)

FOREIGN PATENT DOCUMENTS

WO 9913426 A1 3/1999

*Primary Examiner* — Chae M Ko
(74) *Attorney, Agent, or Firm* — Cooper Legal Group, LLC

(57) ABSTRACT

Techniques for load balancing and fault tolerant service are described. An apparatus may comprise load balancing and fault tolerant component operative to execute a load balancing and fault tolerant service in a distributed data system. The load balancing and fault tolerant service distributes a load of a task to a first node in a cluster of nodes using a routing table. The load balancing and fault tolerant service stores information to indicate the first node from the cluster of nodes is assigned to perform the task. The load balancing and fault tolerant service detects a failure condition for the first node. The load balancing and fault tolerant service moves the task to a second node from the cluster of nodes to perform the task for the first node upon occurrence of the failure condition.

20 Claims, 11 Drawing Sheets

(56) References Cited

U.S. PATENT DOCUMENTS

| | | |
|---|---|---|
| 9,785,480 B2 | 10/2017 | Kamawat et al. |
| 2002/0112196 A1 | 8/2002 | Datta et al. |
| 2002/0198996 A1 | 12/2002 | Sreenivasan et al. |
| 2004/0010588 A1 | 1/2004 | Slater et al. |
| 2004/0205414 A1 | 10/2004 | Roselli et al. |
| 2005/0060608 A1 | 3/2005 | Marchand |
| 2005/0240935 A1 | 10/2005 | Ramanathan |
| 2006/0248294 A1 | 11/2006 | Nedved et al. |
| 2007/0277056 A1 | 11/2007 | Varadarajan et al. |
| 2008/0243866 A1 | 10/2008 | Pandey |
| 2009/0327406 A1 | 12/2009 | Miwa et al. |
| 2010/0162036 A1 | 6/2010 | Linden et al. |
| 2012/0303998 A1 | 11/2012 | Sun |
| 2013/0007741 A1 | 1/2013 | Britsch et al. |
| 2013/0305009 A1 | 11/2013 | Durant et al. |
| 2013/0332608 A1 | 12/2013 | Shiga et al. |
| 2014/0047088 A1* | 2/2014 | Dain .................. H04L 67/59 |
| | | 709/223 |
| 2014/0181035 A1 | 6/2014 | Moue et al. |
| 2014/0214773 A1 | 7/2014 | Zuckerman et al. |
| 2014/0280910 A1 | 9/2014 | Swig et al. |
| 2014/0304399 A1 | 10/2014 | Chaudhary et al. |
| 2014/0310258 A1* | 10/2014 | Tian .................. G06F 16/2471 |
| | | 707/718 |
| 2014/0310259 A1 | 10/2014 | Tian |
| 2014/0351545 A1* | 11/2014 | Nakajima ............ G06F 3/0617 |
| | | 711/170 |
| 2015/0236902 A1 | 8/2015 | Alam et al. |
| 2015/0281336 A1* | 10/2015 | Beale .................. G06F 9/5077 |
| | | 709/201 |
| 2015/0309893 A1 | 10/2015 | Southern et al. |
| 2016/0012525 A1 | 1/2016 | Qiu |
| 2016/0072713 A1 | 3/2016 | Mhatre et al. |
| 2016/0182284 A1 | 6/2016 | Ayanam et al. |
| 2016/0210166 A1 | 7/2016 | Cucinotta et al. |
| 2016/0366220 A1 | 12/2016 | Gottlieb et al. |

* cited by examiner

400

```
BEGIN
 402
```

DISTRIBUTE A LOAD FOR A TASK TO A FIRST NODE IN A CLUSTER OF NODES USING A ROUTING TABLE
404

STORE INFORMATION TO INDICATE THE FIRST NODE FROM THE CLUSTER OF NODEES IS ASSIGNED TO PERFORM THE TASK
406

DETECT A FAILURE CONDITION FOR THE FIRST NODE
408

MOVE THE TASK TO A SECOND NODE FROM THE CLUSTER OF NODES TO PERFORM THE TASK FOR THE FIRST NODE UPON OCCURANCE OF THE FAILURE CONDITION
410

```
END
412
```

*FIG. 4*

LOAD BALANCING AND FAULT TOLERANT SERVICE IN A DISTRIBUTED DATA SYSTEM

RELATED APPLICATIONS

This application claims priority to and is a continuation of U.S. application Ser. No. 16/690,860, filed on Nov. 21, 2019, now allowed, titled "LOAD BALANCING AND FAULT TOLERANT SERVICE IN A DISTRIBUTED DATA SYSTEM," which claims priority to and is a continuation of U.S. Pat. No. 10,521,276, filed on Oct. 9, 2017, "LOAD BALANCING AND FAULT TOLERANT SERVICE IN A DISTRIBUTED DATA SYSTEM," which claims priority to and is a continuation of U.S. Pat. No. 9,785,480, filed on Feb. 12, 2015 and titled "LOAD BALANCING AND FAULT TOLERANT SERVICE IN A DISTRIBUTED DATA SYSTEM," which are incorporated herein by reference.

BACKGROUND

As computer networks have become faster and more reliable, the deployment of network data storage systems in enterprise computing environments has become more widespread. In a typical enterprise computing environment, client systems such as computer workstations, database servers, web servers, and other application servers can access data stored remotely from the client systems, typically in one or more central locations. One or more computer networks connect the client systems to mass storage devices such as disks disposed at the central locations. Such centralized data storage, referred to hereinafter as network data storage, facilitates the sharing of data among many geographically distributed client systems. Network data storage also enables information systems (IS) departments to use highly reliable (sometimes redundant) computer equipment to store their data.

Applications in the computing networks may fail due to an internal coding error in the application, an error in the operating system on which the application is running, an error in the hardware of the computer system on which the application is running, or a combination of any of the above errors. The errors may cause the application, or the operating system, to cease executing (e.g. a crash) or to stop functioning (e.g. a hang). Also, the computing network may become overloaded with requests from clients. A need exists for an improved way to provide high availability upon a detection of failure in the cluster while managing the distribution of client requests.

BRIEF DESCRIPTION OF THE DRAWINGS

FIG. 4 illustrates an embodiment of a detailed logic flow for load balancing and fault tolerant service in a cluster of nodes of FIG. 2.

DETAILED DESCRIPTION

Figure 1:
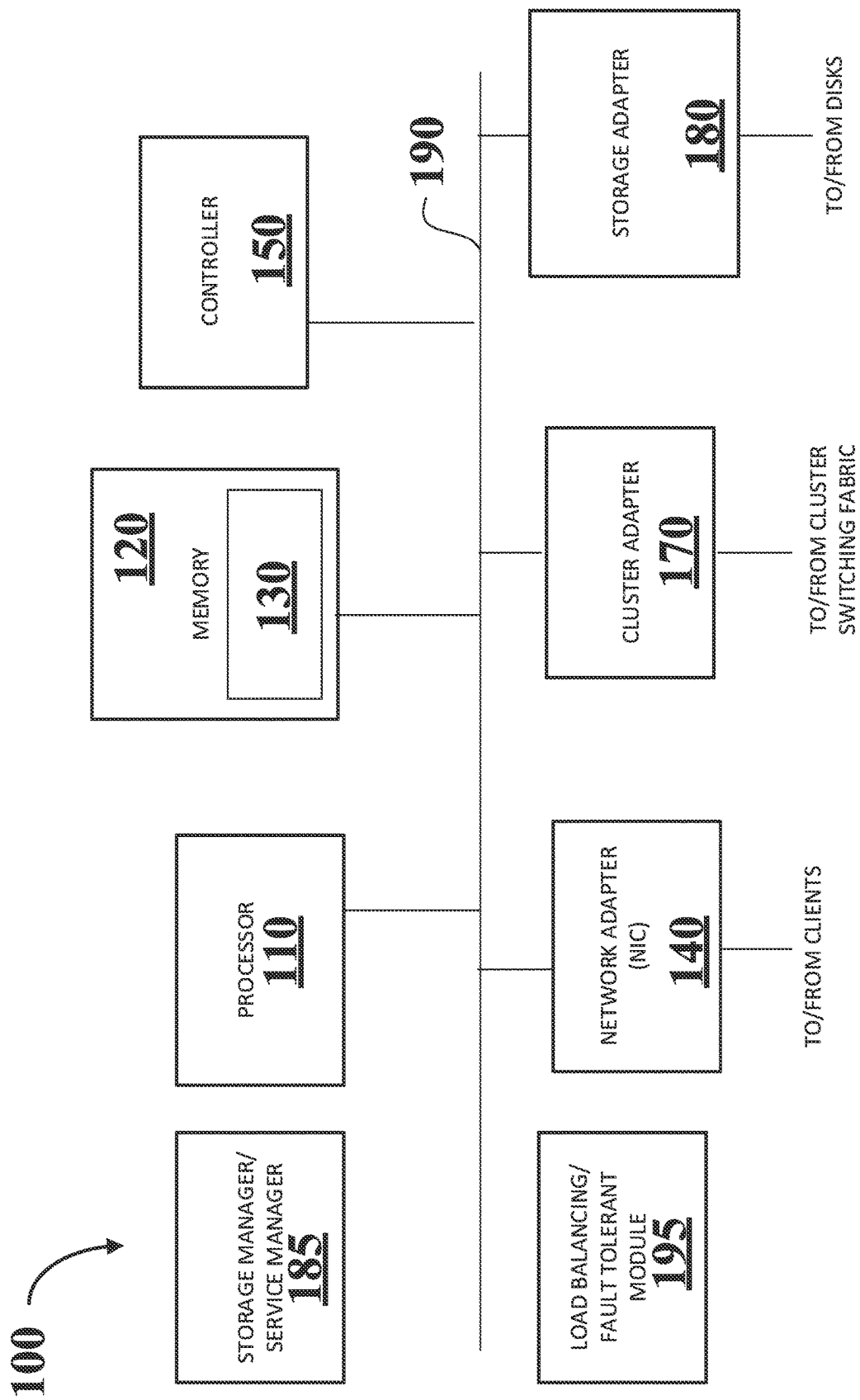
FIG. 1 illustrates an embodiment of a distributed data system.

Various embodiments are generally directed to computer networks that may include virtual machines allowing many computing environments to be implemented within one or more host computing devices. The virtual machine environment operates "atop" a physical computing environment. The virtual machine may comprise its own operating system, applications, and configurations. As such, the virtual machine may function as a self-contained computing environment (even though it is virtual rather than physical). Moreover, one or more virtual machines may be hosted on a single host computing device, such as a desktop, laptop, server, storage controller, etc. For example, a virtual machine may be hosted (e.g., virtualized by a hypervisor, such as a virtual machine management console) using virtual machine data (e.g., virtual machine configuration data and/or one or more virtual machine disks). The virtual machine data may be stored according to a virtual machine layout. The virtual machine permits multiple such virtual machines to be simultaneously/concurrently operable on a single physical computing environment. Each virtual machine is operable on behalf of a corresponding set of users and/or a corresponding set of application programs.

Various embodiments are directed to providing load balancing and fault tolerant service in clustered networking architecture in a distributed data system. Some embodiments are particularly directed to a load balancing and fault tolerant component to execute a load balancing and fault tolerant service in a distributed data system. The load balancing and fault tolerant service distributes a load of a task to a first node in a cluster of nodes using a routing table. The load balancing and fault tolerant service stores information to indicate the first node from the cluster of nodes is assigned to perform the task. The load balancing and fault tolerant service detects a failure condition for the first node. The load balancing and fault tolerant service moves the task to a second node from the cluster of nodes to perform the task for the first node upon occurrence of the failure condition.

Various embodiments are also directed to providing load balancing and fault tolerant service in clustered networking architecture in a distributed data system. Some embodiments are particularly directed to a to a repeated load balancing and fault tolerant service for managing storage virtual machine relationships executing in the distributed data system. The load balancing and fault tolerant service distributes a load of a task, such as backing up each one of multiple storage virtual machines ("SVMs" or "SVM"), to a corresponding node in a cluster of nodes using a routing table.

The task of backing up one of multiple SVMs is just one of the uses of load balancing and fault tolerant service mechanism. The load balancing and fault tolerant service mechanism may be used for purposes other than taking backups of an SVM. For example, the load balancing and fault tolerant service mechanism may periodically compress data on all volumes of an SVM as well as distribute the task of a backup of each one of multiple SVMs. It should be noted that the operations of distributing a load for taking a backup of each storage virtual machine described herein is one of many exemplary embodiments of the load balancing and fault tolerant services. Thus, any reference for distributing a load for taking a backup of each storage virtual machine may be interchanged with any task that may be performed in each storage virtual machine and/or in the cluster of nodes. Hence, the load balancing and fault tolerant service distributes a load of a task to a corresponding node in a cluster of nodes using a routing table.

The load balancing and fault tolerant service stores information to indicate a first node from the cluster of nodes is assigned to a task, such as assigned to backup a first storage virtual machine from the multiple storage virtual machines. The load balancing and fault tolerant service detects a failure condition for the first node. The load balancing and fault tolerant service performs the task, such as taking a backup for the first storage virtual machine, with a second node from the cluster of nodes.

Various embodiments are directed to using a routing table that is replicated by a replicated database (RDB) to every node in a cluster of nodes. The load balancing and fault tolerant service mechanism distributes the load of the task, such as the load to backup each one of the multiple storage virtual machines (SVM). A routing table may be used as a holding place for indicating which record(s) and which node is currently owning the task, such as the task of taking the backup of an SVM.

The replicated database represents a distributed database employed within a cluster to store and share network configuration information for nodes in the cluster, and possibly for all clusters in which node participates. The RDB may form a quorum of nodes in the distributed data system. The RDB may store information about network configuration for other nodes in the cluster or another cluster. The RDB is a service or framework that provides the feature of saving the same information in a structured format across all nodes reliably. The RDB has its own features for maintaining the quorum between all the nodes. The RDB also provides notifications when one node joins the quorum or leaves the quorum.

Various embodiments are directed to storing information in the RDB of all of the nodes by the load balancing and fault tolerant service mechanism indicating which node orchestrates a task, such as a backup for a specific SVM. In the event that a node fails, the SVMs handled by that failing node are failed over to a new node. The task, such as the backup of the SVM, is immediately restarted on the new node. When the original, failing node comes back up, all the responsibility of handling the tasks, such as the backups of SVM, that were originally being handled by this re-activated node are restored. This is accomplished by maintaining a "last-owning-node" list in the routing table. The "last-owning-node" list indicates which node had the last known ownership of the SVM in the replicated routing table.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an embodiment of a distributed data system. In one embodiment, the distributed data system 100 may comprise a computer-implemented system having a software operation application 130 comprising one or more components. The distributed data system 100 in FIG. 1 includes a storage controller 150 in a cluster of nodes. Although the distributed data system 100 shown in FIG. 1 has a limited number of elements in a certain topology, it may be appreciated that the distributed data system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-$a$ may include components 122-1, 122-2, 122-3, 122-4 and 122-5. The embodiments are not limited in this context.

In an exemplary embodiment, the distributed data system 100 includes a processor subsystem that includes one or more processors 110. The distributed data system 100 may comprise a storage controller 150 that may implement one or more of the nodes, such as nodes 210 and 215 in FIG. 2. In one embodiment, the storage controller 150 is a physical processing device that is used to store and retrieve data on behalf of one or more hosts. In an alternative embodiment, the storage controller 150 is a network storage controller that may be configured (e.g., by hardwiring, software, firmware, or any combination thereof) to operate as a storage server that serves one or more clients on a network, to store and manage data in a set of mass storage devices, such as magnetic or optical storage-based disks or tapes. The distributed data system 100 further includes a memory 120, a network adapter 140, a cluster access adapter 170 and a storage adapter 180, all interconnected by an interconnect 190. The cluster access adapter 170 includes a multiplicity of ports adapted to couple one or more nodes together. For example, the cluster access adapter 170 may connect node 210 nodes 215 in FIG. 2. A variety of clustering protocols and interconnect media may be utilized within the cluster architecture described herein. As described herein, a load balancing and fault tolerance module 195 is in communication with the processor 110, memory 130, and other components of the distributed data system 100.

The distributed data system 100 may be embodied as a single- or multi-processor storage system executing a storage operating system 130 that preferably implements a high-level module, such as a storage manager 185, to logically organize the information as a hierarchical structure of named directories, files and special types of files called virtual disks. Illustratively, one or more processors, such as processor 110, may execute the functions of the nodes in the cluster of nodes.

The memory 120 illustratively comprises storage locations that are addressable by the processors and adapters 140, 170, 180 for storing software program code and data structures associated with the present invention. The processor 110 and adapters may, in turn, comprise processing elements and/or logic circuitry configured to execute the software code and manipulate the data structures. The storage operating system 130 may include portions of which may be resident in memory and executed by the processors(s) 110. The storage operating system 130 may functionally organize the distributed data system 100 by configuring the processor(s) 110 to invoke storage operations in support of the storage service provided by a node. It will be apparent to those skilled in the art that other processing and memory implementations, including various computer readable storage media, may be used for storing and executing program instructions pertaining to the technique introduced here.

Figure 2:
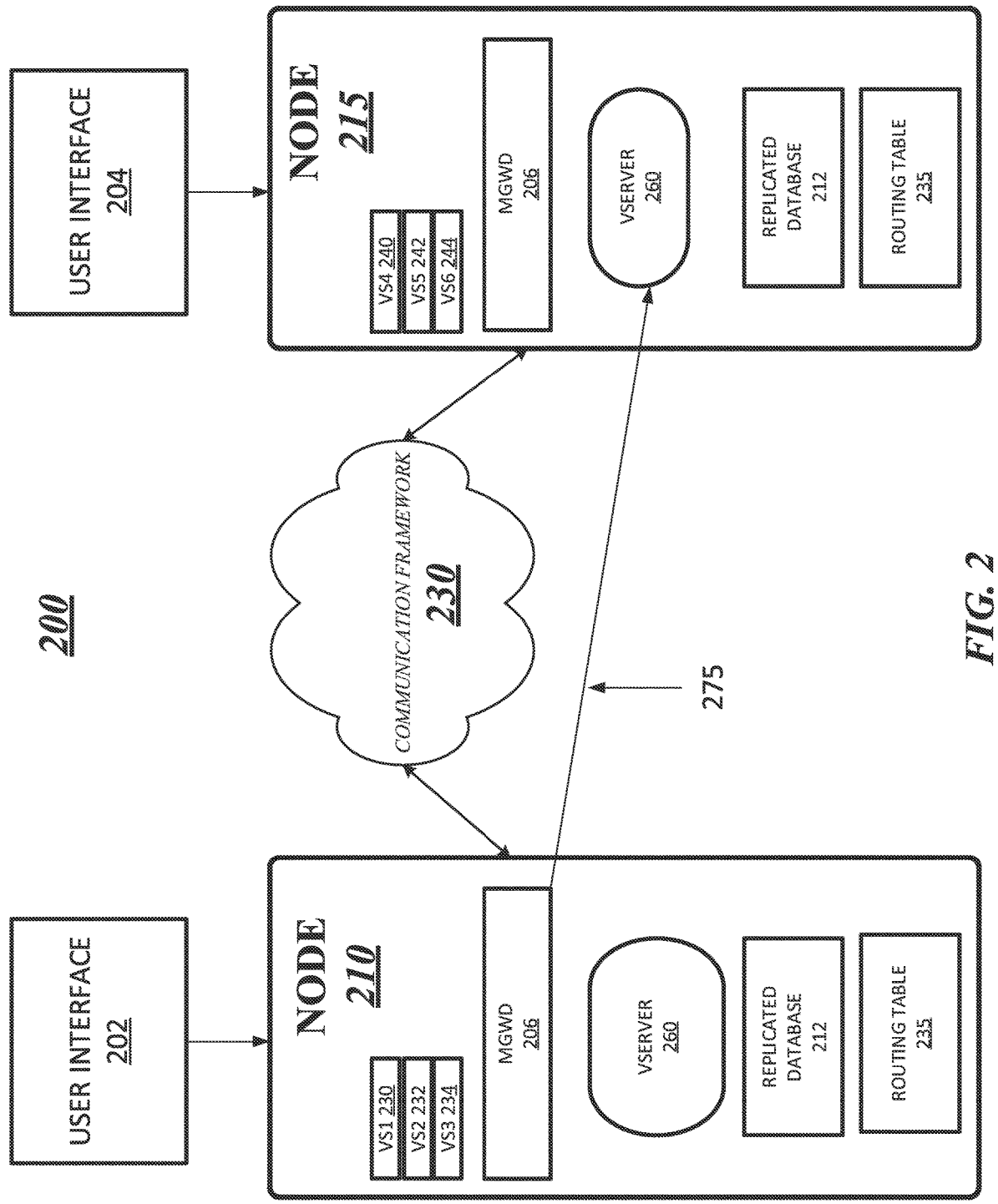
FIG. 2 illustrates an embodiment of a cluster of nodes for managing relationships of a cluster of nodes in distributed data system of FIG. 1.

The network adapter 140 includes a multiplicity of ports to couple the distributed data system 100 to one or more clients 202, 204 of FIG. 2 over point-to-point links, wide area networks, virtual private networks implemented over a public network (Internet) or a shared local area network. The network adapter 140 thus can include the mechanical, electrical and signaling circuitry needed to connect the distributed data system 100 to a network.

The storage adapter 180 cooperates with the storage operating system 130 to access information requested. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks.

Storage of information can be implemented as one or more storage volumes that include a collection of physical storage disks cooperating to define an overall logical arrangement of volume block number (VBN) space on the volume(s). The disks can be organized as a RAID group. One or more RAID groups together form an aggregate. An aggregate can contain one or more volumes/file systems.

The storage operating system 130 facilitates clients' access to data stored on the disks. In certain embodiments, the storage operating system 130 implements a write-anywhere file system that cooperates with one or more virtualization modules to "virtualize" the storage space. In the illustrative embodiment, the storage operating system 130 is a version of the Data ONTAP® operating system available from NetApp®, Inc. and the storage manager 185 implements the Write Anywhere File Layout (WAFL®) file system. However, other storage operating systems are capable of being enhanced or created for use in accordance with the principles described herein.

FIG. 2 illustrates an embodiment of a cluster 200 of nodes for managing relationships of a cluster of nodes in distributed data system of FIG. 1. In a clustered storage system, two or more nodes, such as nodes 210, 215 are connected in a distributed architecture. The cluster 200 is a cluster of computing systems coupled together by one or more communication frameworks 230, such as network 130. The nodes 210, 215 may be implemented by one or more storage controllers 150. Each node 210, 215 is a storage server. The cluster 200 is configured to be a load balancing and fault tolerant service, using the load balancing and fault tolerant 195, as described herein.

The nodes 210, 215 automatically configure cluster paths based on configuration information shared in the cluster 200. In one embodiment cluster 200 is a storage cluster where each node 210, 215 manages access to data stored or hosted on one or more storage resources. Cluster-wide network access information may be stored at each node 210, 215 according to the cluster architecture 200.

Nodes 210, 215 are nodes of the cluster 200 and there may be other nodes in the cluster 200. Each node in the cluster 200 is a potential point of access to the cluster 200 for users.

User interface (UI) 202, 204 represents one or more mechanisms to interact with a user. The UI 202, 204 may be hardware mechanisms as well as software mechanisms to display or otherwise present content to a user and receive input from a user or network protocols, such as NFS (network file system), CIFS (common internet file system), FCP (Fibre Channel protocol), and/or iSCSI (internet small computer system interface) and the like. Nodes 210 and 215 present an image of the cluster to a user through UIs 202 and 204, respectively.

Each node 210 and 215 includes information that indicates where data is located throughout the cluster 200. When a user has access to particular data, the node 210 and 215 shows all accessible cluster data as though available on the node. Thus, the user 202 or 204 can perceive the cluster 200 or collection of nodes 210 and 215 as a single device. A cluster 200 appears to a user 202 or 204 as a single device regardless of the node used as the point of entry or access to the cluster 200.

When the cluster 200 is newly created, one or more entities called virtual servers ("Vserver") are created in the cluster 200. The Vservers in FIG. 2 are labeled as VS1 230, VS2 232, VS3 234 on node 210 and VS4 240, VS5 242, VS6 244 on node 215. The Vserver 230-234 and 240-244 are storage virtual machines (SVM). A Vserver is a single file system namespace that is collectively implemented by all of the nodes in the cluster 200. The Vserver 230-234 and 240-244 are global to the cluster 200. In this context, a Vserver is also an instance of an application service provided to a client system. The cluster 200 may be organized into any suitable number of Vserver 230-234 and 240-244. Each Vserver 230-234 and 240-244 has a user domain and a security domain that are separate from the user and security domains of any other Vserver. Moreover, each Vserver 230-234 and 240-244 is associated with one or more virtual interfaces (VIFs) and can span one or more physical nodes. Client systems can access the data on a Vserver 230-234 and 240-244 via any node 210, 215 of the cluster 200.

Each node 210, 215 in the cluster 200 will have a user space process 260 called "VserverDR" running on the Vserver 230-234 and 240-244. In one embodiment, VserverDR is a virtual storage server (Vserver) for disaster recover (DR) (collectively herein after "VserverDR") and is the process (Vserver DR process 260) that orchestrates the task, such as taking of a backup of an SVM, through a finite state machine. The VserverDR process is a user space process 260 that is primarily responsible for orchestrating an entire process of a task, such as taking a backup of a storage virtual machine (SVM) 230-234 and 240-244. The SVM is a Vserver, such as Vserver 230-234 and 240-244. This VserverDR is made up of configuration information and data on one or more volumes. The VserverDR is the process of providing disaster recovery to a Vserver. VserverDR may also refer to a user space process. The VserverDR process may be integrated with a service manager 185 of FIG. 1. The VserverDR process may store both the state and current operation of a relationship in a routing table 235. The routing table 235 can be a persisted RDB table. The RDB tables exist on all of the nodes of the cluster. Each VserverDR process on each node 210, 215 handles a set of disaster recover (DR) relationships. In order to perform a task, such as a task for taking a backup of an SVM, a DR relationship is created between a first SVM having the task, such as the backup operation being performed thereon, and a second SVM receiving the task (e.g., receiving the backup) of the first SVM. In other words, in order to perform a task, such as taking a backup of an SVM, a disaster recovery (DR) relationship is created and established between the first SVM that needs to be backed up and the second SVM into which the first SVM is going to be backed up.

For example, all requests for a specific relationship will have to reach a particular VserverDR on a respective node VserverDR process. In one embodiment, another user space process 208 called "MGWD" runs in the ONTAP operating system. Each node 210, 215 has one running instance of MGWD 206. The VserverDR Process 260 includes the routing table 235 that keeps track of the current operation and statistics of previous operations. The routing table 235 is used during a failover process.

Nodes 210, 215 also include a replicated database (RDB) 212, which represents a distributed database employed within cluster 100 to store and share network configuration information for nodes in the cluster, and possibly for all clusters in which nodes 210, 215 participates. RDB 212 may store information about network configuration for other nodes in cluster 100 or another cluster (not shown). Such information stored in RDB 212 may be networks and addresses for each node in cluster 100, as well as network capabilities for each address of each node. The information is maintained using distributed database techniques to share and update the distributed database. The RDB 212 represents a distributed database employed within the cluster 200 to store and share network configuration information for nodes 210, 215 in the cluster, and possibly for all clusters in which a node participates.

In one embodiment, a node 210, 215 automatically populates and updates the replicated database (RDB) 212 with information about IP addresses and network capabilities of other nodes in the cluster 200. As used herein, a distributed database and RDB refer to distributed database technology where configuration and management information is distributed through the network rather than located in a single manager. A distributed database replicates information at multiple or possibly all nodes, and propagates updates to the information throughout the network. Thus, in one embodiment, each node 210, 215 in the cluster 200 includes information indicating IP addresses and corresponding or associated network port capabilities for all other nodes in the cluster 200. All nodes 210, 215 in the cluster 200 have information about the IP addresses of remote nodes. The nodes 210, 215 also maintain information as to what are the underlying network capabilities of those particular IP addresses.

Generally speaking, such information about the nodes in the cluster allows the nodes to determine what networks may be available for communication with other nodes in the cluster. The node dynamically selects a network type for cluster communication with another node. The nodes also include information that indicates where data is stored through the cluster. Thus, for a request for data at any node, the node receiving the request can determine where in the cluster the information is located. The node receiving the request may also determine the network addresses and associated network capabilities that may be used to access a remote node. The receiving node selects from among identified networks and networks addresses to connect to the other (remote) node.

As mentioned above, each VserverDR process on each node 210, 215 handles a set of DR relationships. The DR relationship is the relationship that is created between a primary SVM and secondary SVM for the task, such as taking a backup of the primary SVM into the secondary SVM. Each requests for the task, such as taking the backup of a first SVM, must reach the node that is handling the task, such as the task of backing up the first SVM. For example, in FIG. 2 a command 275 is executed for VS5 242 and will be handled by node 215. The command 275 will reach the VserverDR process 260 of node 215. Commands are executed on user interface 202 of node 210 for VS4 240 and VS5 242. VserverDR process 260 of node 215 will orchestrate commands VS 6 244. For example, only the VserverDR process 260 of node 215 will orchestrate all snapmirror commands. The VserverDR process 260 also includes a task queue for each Vserver. The task queue indicate all of task the VserverDR process 260 is handling. The subsystems calling into the VserverDR Process 260 may queue a task on the task queue of the VserverDR Process 260.

The subsystems are configuration replication streams (CRS) that will call into VserverDR process 260 when a configuration replication finishes. The Snapmirror subsystem is when volume data replication finishes. The CRS and snapmirror subsystems replicate and backup both the configuration and the data of an SVM and call into the VserverDR process 260. A main thread of the VserverDR Process 260 is monitoring the task queues for any newly created tasks. A new task triggers a workflow. The workflow may be the orchestration process of taking the backup of the SVM's configuration and data. The workflow takes the snapshot of the configuration of a first SVM through CRS and transfers the snapshot to a secondary SVM through CRS. The workflow takes snapshot of data of the first SVM through the snapshot subsystem and transfers it to a secondary SVM through the snapmirror subsystem.

Each VserverDR Process 260 has one processing thread that goes through a task queue of each Vserver 230-234, 240-244, 250-254 and processes any request whose status is queued.

Figure 3:
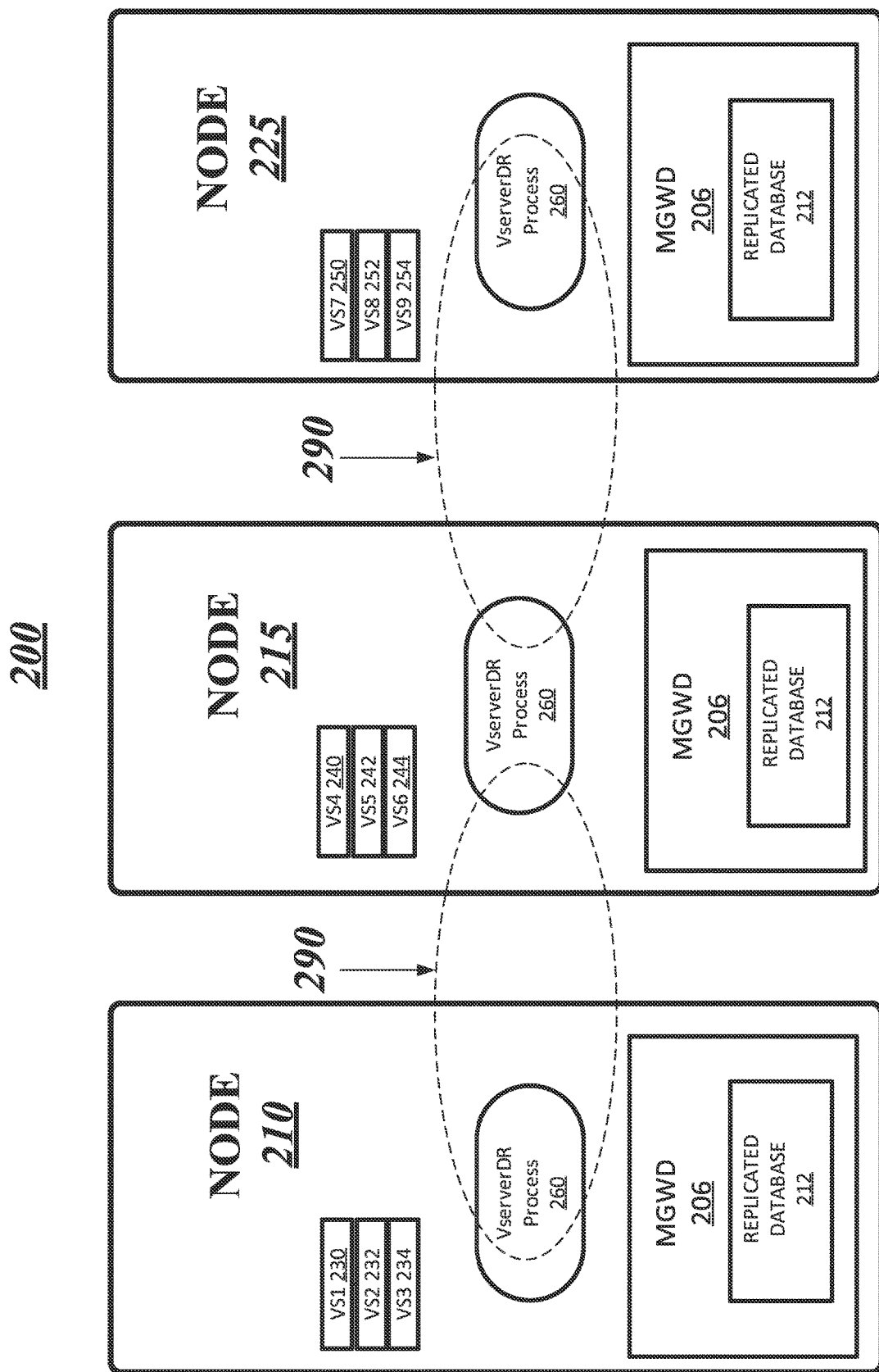
FIG. 3 illustrates an embodiment of a cluster of nodes having a ring of replicated database services of FIG. 2.

FIG. 3 illustrates an embodiment of a cluster of nodes having a ring of replicated database services of FIG. 2. In FIG. 3, a quorum of nodes is formed from node 210, node 215, and node 225. FIG. 3 illustrates a destination cluster with 3 nodes 210, 215, and 215 resulting in three VserverDR Process 260. Similar to node 210 and 215, node 225 includes a VserverDR Process 260 and a replicated database 212. Node 225 includes VS7 250, VS8 252, and VS9 254 on node 210. Each Vserver VS7 250, VS8 252, and VS9 254 is a storage virtual machine. The RDB 212 saves the same information for all Vserver VS7 250, VS8 252, and VS9 254 in a structured format across each nodes 210, 215, and 225. The RDB 212 maintains the quorum between all the nodes 210, 215, and 225. The RDB 212 also provides notifications when any node joins the quorum or leaves the quorum. As shown in FIG. 3, the includes the MGWD process 206 includes RDB database 212.

Each node 210 215, 225 includes the MGWD user space process 206. The MGWD user space process 206 contacts each other MGWD user space process 206 to form an RDB ring 290.

The VserverDR Process 260 allows the SVM to be scalable. The VserverDR Process 260 is scalable because each VserverDR Process 260 on each node 210, 215, and 225 handles a set of relationships between the nodes 210 215, 225. When a new node is added to the cluster 200, the VserverDR relationships are redistributed amongst the nodes. The VserverDR Process 260 may operate in delegation mode and communicate with other VserverDR Process 260. The VserverDR Process 260 also assists when one of the nodes 210 215, 225 experiences a failure in the cluster 200. For example, the VserverDR Process 260 delegates the work of taking a snapshot of a primary SVM, transfers the snapshots to snapmirror and applies the configuration to a destination node. The source module is the piece of code in the cluster, which hosts the source and/or primary SVM. The source module communicates with the local cluster's CRS and/or DM to take a configuration snapshot and also communicates to a snapshot module to take snapshot of data on volumes. The DM is a module inside of the CRS process that is an interface for the VserverDR process 260 for handling the configuration replication of an SVM.

It should be noted that VserverDR process may not assist when a node fails. When a node fails, only after the routing table 235 is changed, the new nodes VserverDR process 260 become involved in the task, such as taking of a backup of the SVM.

All the nodes 210 215, 225 communicate back and forth using notifications to each VserverDR Process 260 on each nodes 210 215, 225. The VserverDR Processes 260 is queued in the task queue.

The MGWD user space process 206 includes a MGWD monitor thread and/or callback thread that will detect when a node 210, 215, or 225 has left the quorum of the nodes. All existing operations will continue to process. In the event the master node 212 fails for any reason, a library of the RDB 212 of all the nodes elects a new master node. The monitor thread is checked to determine if the status of MGWD user space process 206 of the newly elected node has changed to indicate master node. For the new master node, the monitor thread is started. For the secondary node(s) whose previous status was the master node, the monitor thread is signaled to stop if the monitor thread is already running. The monitor thread on its initiation for the master node will check for the active node sites and redistribute the load.

The embodiments are not limited to this example.

FIG. 4 illustrates an embodiment of a detailed logic flow 400 for load balancing and fault tolerant service in a cluster of node. In the illustrated embodiment shown in FIG. 4, the logic flow 400 may begin at block 402. The logic flow then proceeds to block 404. A load for a task is distributed to a first node in a cluster 200 of nodes 210, 215 using a routing table 235 that has been replicated to each node 210, 215 in a cluster 200 at block 404. For example, a load for taking a backup of each storage virtual machine (Vserver) may be distributed using a routing table 235 that has been replicated to each node in a cluster of nodes via the RDB 212. The logic flow 400 moves to block 406.

Information is stored to indicated the first node from the cluster of nodes is assigned to perform the task at block 406. For example, information is stored for correlating and maintaining relationships as to which node is responsible for performing the task, such as the task of taking a backup of a respective storage virtual machine. The logic flow 400 moves to block 408.

A failure condition is detected in a first node, such as node 210, at block 408. The logic flow moves to block 410. The task is moved to a second node, such as node 215, from the cluster 200 of nodes to perform the task for the first node upon occurrence of the failure condition at block 410. For example, upon detecting a node in the cluster has failed or is predicted to fail, both of which are failure conditions, the taking a backup of each storage virtual machine (Vserver) by a failing node, such as node 210, may be failed over to a new node, such as node 215. The logic flow 400 may end at block 412.

The embodiments are not limited to this example.

Figure 5:
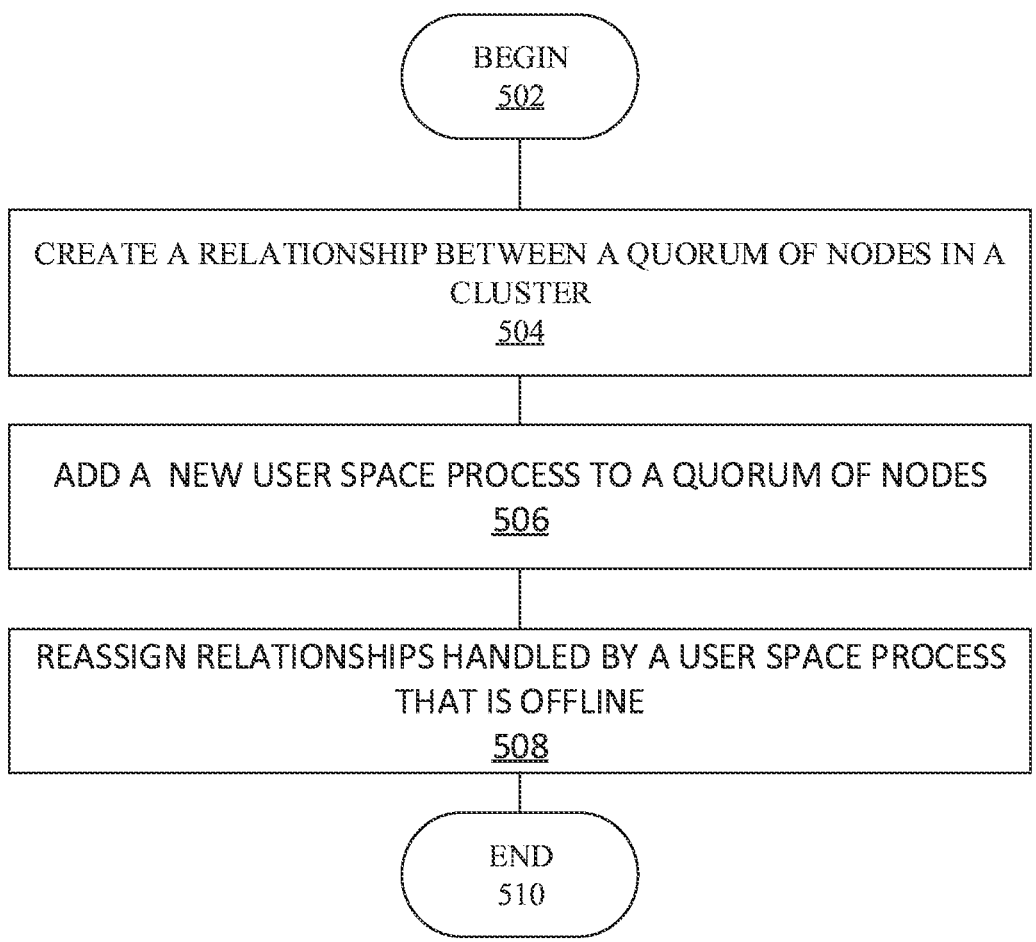
FIG. 5 illustrates an embodiment of a detailed logic flow for assigning relationships to a node as part of the load balancing and fault tolerant service of FIG. 2.

FIG. 5 illustrates an embodiment of a detailed logic flow 500 for assigning relationships to a node as part of the load balancing and fault tolerant service of FIG. 2. In the illustrated embodiment shown in FIG. 5, the logic flow 500 may begin at block 502. The logic flow then proceeds to block 504. The logic flow 500 may create a relationship between a quorum of nodes in a cluster 200 at block 504. For example, nodes 210, 215 may form a quorum. The logic flow 500 adds a new user space process (VserverDR Process 260) to the new node in the quorum of the nodes in the cluster 200 at block 506. The logic flow 500 reassigns relationships handled by the user space process (VserverDR Process 260) when the user space process (VserverDR Process 260) fails or is offline at block 508. The logic flow 500 may end at block 510.

The embodiments are not limited to this example.

Figure 6:
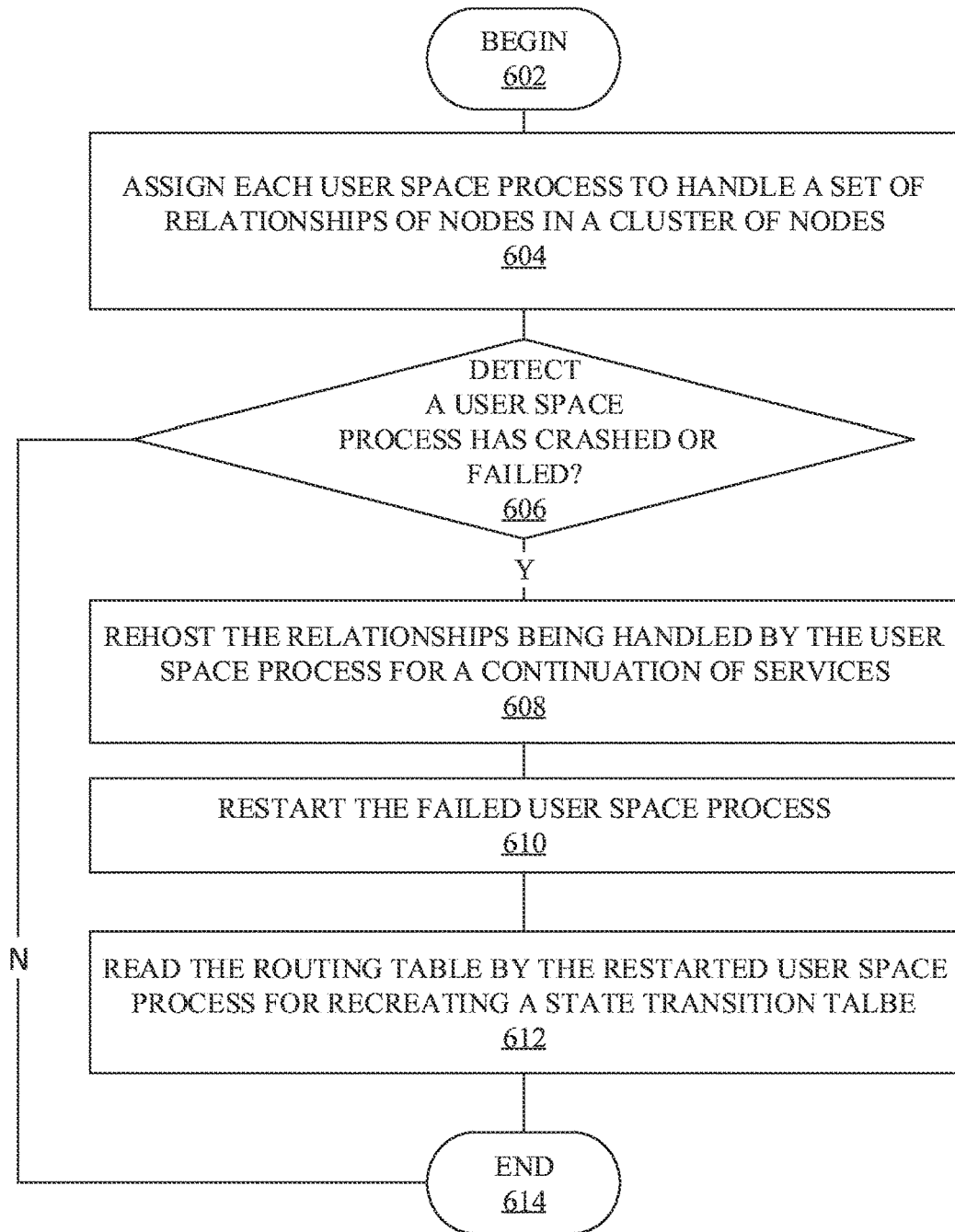
FIG. 6 illustrates an embodiment of a detailed logic flow for executing the load balancing and fault tolerant service upon a node failure of FIG. 2.

FIG. 6 illustrates an embodiment of a detailed logic flow 600 for executing the load balancing and fault tolerant service upon a node failure of FIG. 2. In the illustrated embodiment shown in FIG. 6, the logic flow 600 may begin at block 602. The logic flow 600 then proceeds to block 604. The logic flow 600 may assign each user space process (VserverDR Process 260) of each node to handle a set of VserverDR relationships in the cluster 200 at block 604. The logic flow 600 determines and detects if a user space process (VserverDR Process 260) has crashed, failed, or is offline at block 606. If no, the logic flow 600 ends at block 614. It should be noted that a node may only have one VserverDR process 260.

If the node or user space process (VserverDR Process 260) has failed, a library in the RDB 212 provides a set of classes to find all the healthy nodes in the cluster 200. The fail over operation will leverage and use the RDB ring 290 of the MGWD user space process 206 to detect a node is either failing or being activated. The MGWD user space process 206 of a master node 215 may run a monitoring thread. The monitoring thread checks the health (e.g., performance status) of the RDB ring 290 of the cluster 200 at a predetermined time interval and determines if a remote MGWD user space process 206 has failed. The MGWD user space process 206 of the master node then reassigns or rehosts to the active nodes in the cluster 200 all of the relationships handled by the failed node. The routing table 235 in the MGWD user space process 206 of each node is updated. The workload of the cluster is rebalanced when the failed node is reactivated or when a new node is added to the cluster 220. The logic flow 600 moves to block 608.

If the user space process (VserverDR Process 260) has crashed, failed, or is offline, the logic flow 600 rehosts the relationships being handled by the failed user space process (VserverDR Process 260) for enabling a continuation of services of the node at block 608. As part of re-hosting a relationship, a library of the RDB 212 provides a set of classes to find the healthy nodes in the cluster 200 for use by a failover operation. The MGWD user space process 206 of the RDB ring 290 is leveraged and used to detect a node is either failing or being activated. The callback threads are called when the master node or a secondary node goes down in the MGWD user space process 206 ring 290 (also referred to as RDB ring 290). The routing table 235 for the VserverDR relationships is changed in the callback threads. An attempt to cleanup the transition state of the user space process (VserverDR Process 260) is made on a node in the event the MGWD user space process 206 crashed but the node is still active. The node information is preserved to a failback operation of the relationship when a failed node is reactivated and comes back up online in the cluster. A check may be performed to determine if the failed node has come back up online. If yes, the relationship is rehosted back to the original node.

If a node goes down for a predetermined duration, the monitor thread will identify the node as a failed node and distribute the set relationships handled by the failed node. The routing table 235 of the MGWD user space process 206 will be changed accordingly. The reassigning of relationships of a failed node is delayed for a time period until the node is reactivated. A service manager 185 is used to restart the user space process (VserverDR Process 260) when the node fails. When the user space process (VserverDR Process 260) restarts, the user space process (VserverDR Process 260) will pull the information from MGWD user space process 206 about the relationships of the SVMs handled by the node.

Following block 608, the logic flow moves to block 610.

The logic flow 600 restarts the failed user space process (VserverDR Process 260) at block 610. The logic flow 600 reads the routing table by the restarted user space process (VserverDR Process 260) for recreating a state transition table at block 612. The logic flow 600 may end at block 614.

For restarting the operation, a reboot operation may be employed. First, a snapmirror initialize resynchronization operation may be performed. The snapmirror initialize resynchronization may or may not be executed. The beginning of the operation is stored in RDB routing table and a value removed at the end of the operation. If a value is available on a restart, the value is an indication of an interrupted operation and a restart is executed.

A snapmirror manual update may be performed and will be restarted after a node reboot operation if the relationship has failed over to a new node. On failover to a new node, the new node is checked if a marker is present in a CRS stream (e.g., a configuration replication stream). The snapmirror relationship between a primary SVM and a secondary SVM creates the CRS stream to take the configuration of the primary SVM into the secondary SVM. The presence of the marker indicates a transfer in progress. The marker will have information about whether the transfer type is a manual update or not. The marker is checked and a manual update is restarted.

A "snapmirror create" operation creates a DR relationship between two SVMs: a primary SVM that needs to be backed up and a secondary SVM into which this primary SVM will be backed up. A "snapmirror Initialize" operation initiates the transfer of SVM contents (the SVMs configuration and data on volumes) from the primary SVM to the backup or secondary SVM. This is a baseline transfer, meaning the entire contents of primary are taken across to the secondary SVM. A "snapmirror update" operation is an incremental transfer. The snapmirror initialize operation would have taken everything initially. The snapmirror update operation will take the additional changes that have happened after the previous snapmirror initialize operation. A "scheduled-update" operation initiates an incremental update at regular intervals. A "snapmirror break" operation breaks the relation between primary and secondary preventing any future transfers between primary and secondary once the relationship is broken. A "snapmirror resync" operation is for re-establishing an already broken relationship.

A snapmirror schedule update operation may be restarted if there is a schedule miss and the schedule miss will be detected and an update will be restarted. A snapshot will be taken. A snapmirror break operation may be restarted if there was a break in progress and the break will be detected and restarted on the failover of the node. The relationship status will be breaking until the failover occurs. A snapmirror delete operation may be performed if there was a delete in progress, and the delete will be restarted on node failover.

The relationship status will be deleting and the administration will be required to issue the delete command for deleting a relationship. No other operations will be allowed on this relationship once the status is set to deleting. A snapmirror quiesce operation may be performed if the snapmirror quiesce had already completed. The quiesce status will be maintained. If the quiesce is still ongoing, the quiesce will be restarted after a failover. A snapmirror resume operation is intercepted by a node failover and will not be restarted and no visible change to the relationship of the nodes will occur. An administrator will have to restart the snapmirror resume operation based on the fact that the relationship status is Quiesced. A snapmirror abort is intercepted by a node failover and will not be restarted and no visible change to the relationship will occur. An administrator will have to restart the snapmirror abort based on the fact that the relationship status is transferring. For every snapmirror and/or VserverDR relationship, there will be a relationship status. For example, when the relationship is created and no transfer between the primary SVM and the secondary SVM is occurring, the snapmirror and/or VserverDR relationship may have an idle status. During the transfer operation, the snapmirror and/or VserverDR relationship has a "transferring status." A breaking status, a deleting status, and a quescing status may also occur for the snapmirror and/or VserverDR relationship.

The embodiments are not limited to this example.

Figure 7:
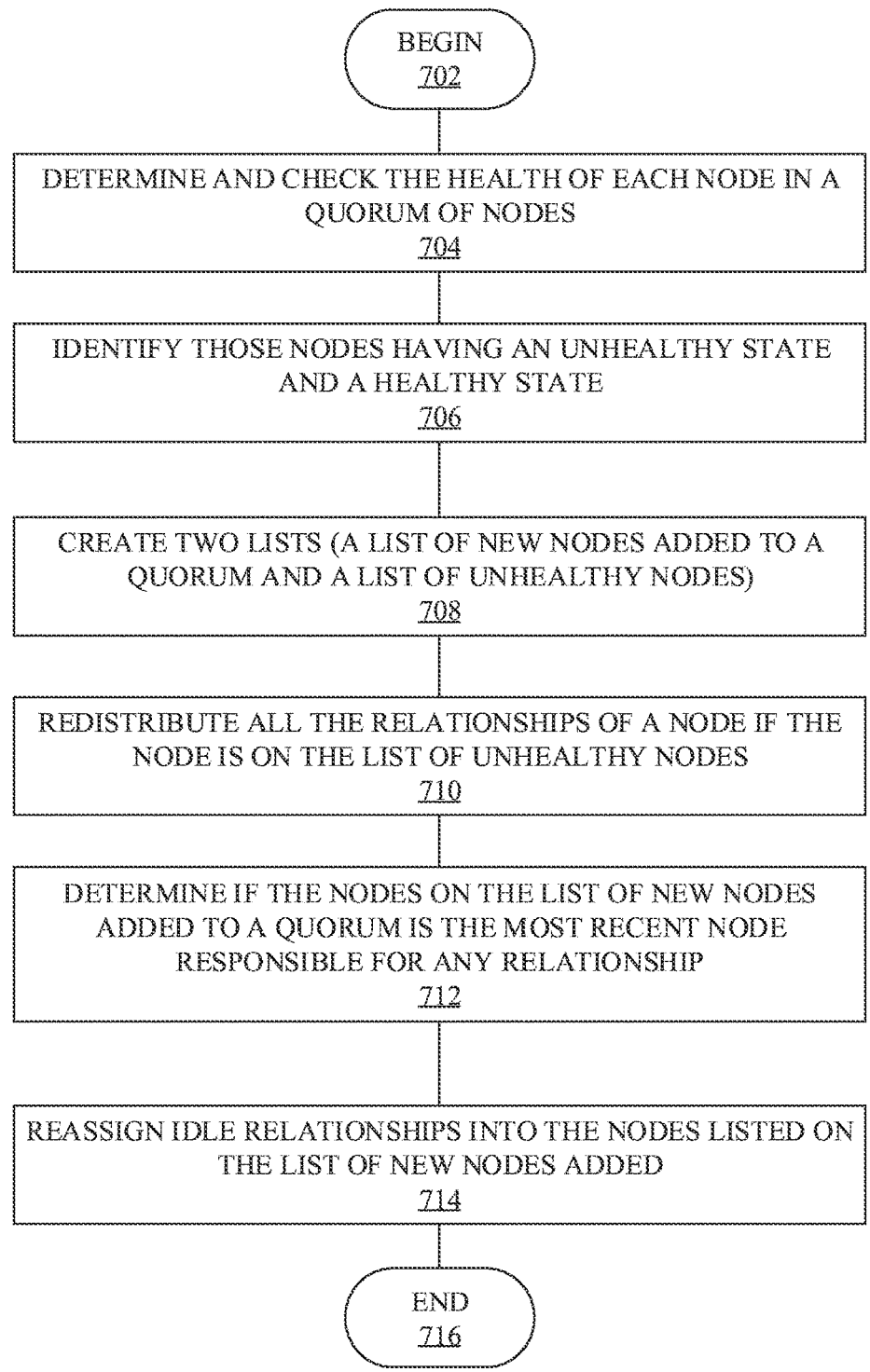
FIG. 7 illustrates an embodiment of a detailed logic flow for managing the health of a node as part of the load balancing and fault tolerant service of FIG. 2.

FIG. 7 illustrates an embodiment of a detailed logic flow 700 for managing the health of a node as part of the load balancing and fault tolerant service of FIG. 2. In the illustrated embodiment shown in FIG. 7, the logic flow 700 may begin at block 702. The logic flow 700 then proceeds to block 704. The logic flow 700 may determine and check a performance state (e.g., the health) of each node in the quorum of nodes in the cluster 200 at block 704. The logic flow 700 identifies those nodes having a performance state as both an unhealthy state and a healthy state at block 706. The logic flow 700 creates two lists: 1) a list of new nodes added to the quorum of nodes in the cluster 202 and 2) a list of unhealthy nodes at block 708. The logic flow 700 redistributes all the relationships of the nodes identified on the list of unhealthy nodes at block 710. The logic flow 700 determines if the nodes on the list of new nodes added are the most recent node responsibility for any relationship at block 712. The logic flow 700 reassigns idle relationships to the nodes listed on the list of nodes added at block 714. The logic flow 700 may end at block 716.

The embodiments are not limited to this example.

Thus, as described herein, various embodiments are directed to providing load balancing and fault tolerant service in clustered networking architecture in a distributed data system. Some embodiments are particularly directed to a to a load balancing and fault tolerant service for managing storage virtual machine relationships executing in the distributed data system. The load balancing and fault tolerant service to distributes a load of a task(s) to a corresponding node in a cluster of nodes using a routing table. The load balancing and fault tolerant service stores information to indicate a first node from the cluster of nodes is assigned to perform all or a portion of the load of the task. The load balancing and fault tolerant service detects a failure condition for the first node. The load balancing and fault tolerant service performs the task with a second node from the cluster of nodes. The load balancing and fault tolerant service restarts the task by the second node upon occurrence of the failure condition.

The load balancing and fault tolerant service creates a relationship between the first node and the second node in the cluster of nodes. The load balancing and fault tolerant service delegates the relationship from the first node to the second node for load balancing the second node in the cluster of nodes upon detection of the failure condition of the first node. The load balancing and fault tolerant service detect return of the first node to an active status. The load balancing and fault tolerant service returns the relationship to the first node upon the first node returning to the active status following the failure condition. As needed, the load balancing and fault tolerant service may join a new node that is capable of receiving the load to the cluster of nodes.

More specifically, for example, the load balancing and fault tolerant service restores to the first node the load to backup the first storage virtual machine upon the first node becoming active after the failure condition.

Various embodiments are directed to replicating the routing table to the corresponding node in the cluster of nodes using a replicated database (RDB) service, wherein the RDB service is used for saving similar information in a structured format in the corresponding node in the cluster of nodes, maintaining quorums of the cluster of nodes, and providing a notification upon a node joining or leaving one of the quorums of the cluster of nodes.

The load balancing and fault tolerant service maintains in the routing table an ownership list indicating which node in the cluster of nodes is a most recent owner responsible for performing a task, such as backing up each one of the multiple storage virtual machines. The load balancing and fault tolerant service determines whether the first node in the cluster of nodes is in a healthy state or an unhealthy state. The load balancing and fault tolerant service maintains user space processes on each node for distributing the load of the task, such as the load of the task to backup each one of the multiple storage virtual machines.

In various embodiments are directed to providing load balancing and fault tolerant service in clustered networking architecture in a distributed data system. Some embodiments are particularly directed to a to a load balancing and fault tolerant service for managing storage virtual machine relationships executing in the distributed data system. The load balancing and fault tolerant service to distributes a load to backup each one of multiple storage virtual machines to a corresponding node in a cluster of nodes using a routing table. The load balancing and fault tolerant service stores information to indicate a first node from the cluster of nodes is assigned to backup a first storage virtual machine from the multiple storage virtual machines. The load balancing and fault tolerant service detects a failure condition for the first node. The load balancing and fault tolerant service performs a backup for the first storage virtual machine with a second node from the cluster of nodes.

The load balancing and fault tolerant service replicates the routing table to the corresponding node in the cluster of nodes using a replicated database (RDB) service. The load balancing and fault tolerant service uses the RDB service to save similar information in a structured format in the corresponding node in the cluster of nodes, maintain quorums of the cluster of nodes, and provide a notification upon a node joining or leaving one of the quorums of the cluster of nodes. The load balancing and fault tolerant service restarts the backup of the one of the multiple storage virtual machines by the second node upon occurrence of the failure condition. The load balancing and fault tolerant service restores to the first node the load to backup the first storage virtual machine upon the first node becoming active after the failure condition. The load balancing and fault tolerant service maintains in the routing table an ownership list indicating which node in the cluster of nodes is a most recent owner responsible for backing up each one of the multiple storage virtual machines, determines the whether the first node in the cluster of nodes is in a healthy state or an unhealthy state, and maintains user space processes on each node for orchestrating each process for distributing the load to backup each one of the multiple storage virtual machines.

In one embodiment, the load balancing and fault tolerant service component determines a performance state for the first node in the cluster of nodes. The performance state may either be unhealthy state (e.g., a fault condition) or a healthy state (e.g., no fault condition). The load balancing and fault tolerant service component detects a failure condition in the first node and also detects if the performance states the first node is ready to resume an active state. In one embodiment, the determination of a failure condition (unhealthy state) is based on evaluation of the performance state of the first node.

In one embodiment, a load balancing and fault tolerant service component is operative on a processor circuit to execute a load balancing and fault tolerant service in a distributed data system. The load balancing and fault tolerant component to distribute a load of a task to a corresponding node in a cluster of nodes using a routing table, store information to indicate a first node from the cluster of nodes is assigned to perform the task, detect a failure condition for the first node, and perform the task for the first storage virtual machine by moving the task to a second node from the cluster of nodes to perform the task. The load balancing and fault tolerant component replicates the routing table to the corresponding node in the cluster of nodes using a replicated database (RDB) service. The load balancing and fault tolerant component uses the RDB service to save similar information in a structured format in the corresponding node in the cluster of nodes, maintain quorums of the cluster of nodes, and/or provide a notification upon a node joining or leaving one of the quorums of the cluster of nodes. The load balancing and fault tolerant component restarts the task by the second node upon occurrence of the failure condition. The load balancing and fault tolerant component restores to the first node the load to perform the task upon the first node becoming active after the failure condition. The load balancing and fault tolerant component maintains in the routing table an ownership list indicating which node in the cluster of nodes is a most recent owner responsible for performing the task, determines the whether the first node in the cluster of nodes is in a healthy state or an unhealthy state, and/or maintains user space processes on each node for orchestrating each process for distributing the load to perform the task.

Figure 8:
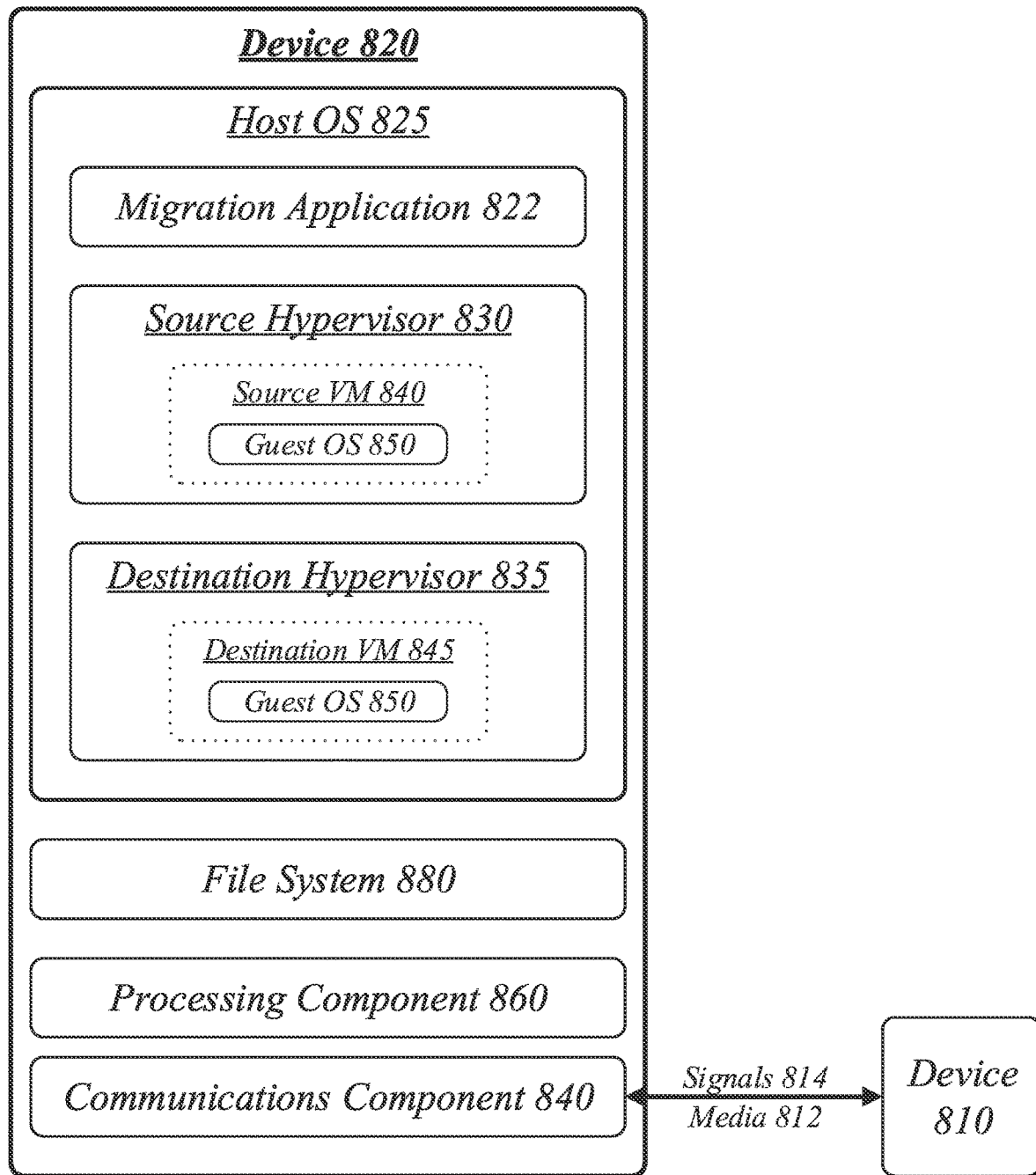
FIG. 8 illustrates an embodiment of a centralized system for the virtual machine migration system of FIG. 1.

FIG. 8 illustrates a block diagram of a centralized system 800. The centralized system 800 may implement some or all of the structure and/or operations for the distributed data system 100 having one or more clusters 200.

The device 820 may comprise any electronic device capable of receiving, processing, and sending information for the centralized system 800. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the centralized system 800 using a processing component 860. The processing component 860 may comprise various hardware elements, software elements, or a combination of both.

Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the centralized system 800 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with a device 810 over a communications media 812 using communications signals 814 via the communications component 840. The device 810 may be internal or external to the device 820 as desired for a given implementation.

The device 820 may host a host operating software (OS), a host 825 running a migration application 822, source hypervisor 830, and destination hypervisor 835, with the source VM 140 and destination VM 845 provided by the respective hypervisors 830, 835. The device 820 may also host the file system 880 storing the virtual disk blocks for the source VM virtual disk and destination VM virtual disk. The migration application 822 may perform the migration of the guest OS 850 from the source VM 840 to the destination VM 845 on the device 820.

The device 810 may provide support or control for the migration operations of the migration application 822 and/or the hosting operations of the device 820 and host 825. The device 810 may comprise an external device externally controlling the device 820, such as where device 810 is a server device hosting the guest OS 850 and the device 810 is a client administrator device used to administrate device 810 and initiate the migration using migration application 822. In some of these cases, the migration application 822 may instead be hosted on the device 810 with the remainder of the virtual machine migration system 100 hosted on the device 820. Alternatively, the device 810 may have hosted the migration application 822 as a distribution repository, with the migration application 822 downloaded to the device 820 from the device 810.

Figure 9:
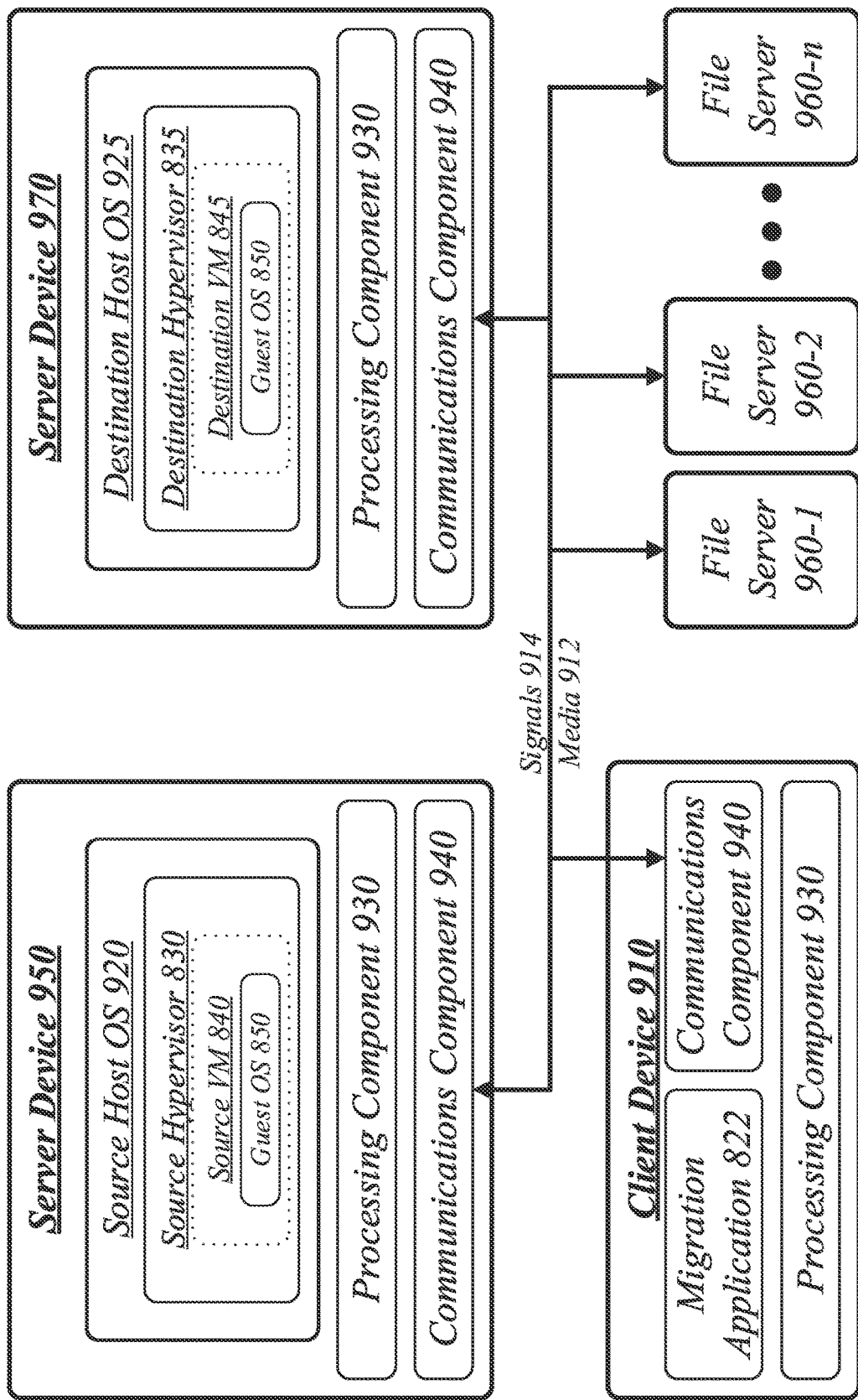
FIG. 9 illustrates an embodiment of a distributed system for the virtual machine migration system of FIG. 1.

FIG. 9 illustrates a block diagram of a distributed system 900. The distributed system 900 may distribute portions of the structure and/or operations for the distributed data system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and server devices 950 and 970. In general, the client device 910 and the server devices 950 and 970 may be the same or similar to the client device 820 as described with reference to FIG. 8. For instance, the client device 910 and the server devices 950 and 970 may each comprise a processing component 930 and a communications component 940 which are the same or similar to the processing component 860 and the communications component 840, respectively, as described with reference to FIG. 8. In another example, the devices 910, 950, and 970 may communicate over a communications media 912 using communications signals 914 via the communications components 940. The distributed system 900 may comprise a distributed file system implemented by distributed file servers 960 including file servers 960-1 through 960-*n*, where the value of n may vary in different embodiments and implementations. The local storage of the client device 910 and server devices 950, 970 may work in conjunction with the file servers 960 in the operation of the distributed file system, such as by providing a local cache for the distributed file system primarily hosted on the file servers 960 so as to reduce latency and network bandwidth usage for the client device 910 and server devices 950, 970.

The client device 910 may comprise or employ one or more client programs that operate to perform various methodologies in accordance with the described embodiments. In one embodiment, for example, the client device 910 may implement the migration application 822 initiating, managing, and monitoring the migration of the guest OS 850 from the source VM 840 to the destination VM 845. The client device 910 may use signals 914 to interact with the source hypervisor 130, destination hypervisor 835 and/or guest OS 850 while they are running on each of the source VM 840 and destination VM 845, and file servers 960.

The server devices 950, 970 may comprise or employ one or more server programs that operate to perform various methodologies in accordance with the described embodiments. In one embodiment, for example, the server device 950 may implement a source host OS 920 hosting the source hypervisor 830 providing the source VM 840. The server device 950 may use signals 914 to receive control signals from the migration application 822 on client device 910 and to transmit configuration and status information to the migration application 822. The server device 950 may use signals 914 communicate with the file servers 960 both for the providing of source VM 840 and for the migration of guest OS 850 from the source VM 840 to the destination VM 845.

The server device 970 may implement a destination host OS 925 hosting the destination hypervisor 835 providing the destination VM 845. The server device 970 may use signals 914 to receive control signals from the migration application 822 on client device 910 and to transmit configuration and status information to the migration application 822. The server device 970 may use signals 914 communicate with the file servers 960 both for the providing of destination VM 845 and for the migration of guest OS 850 to the destination VM 845 to the source VM 840.

In some embodiments, the same server device may implement both the source hypervisor 830 and the destination hypervisor 835. In these embodiments, the migration application 850 hosted on a client device 910 may perform the migration of the guest OS 850 from the source VM 840 to the destination VM 845 on this single server device, in conjunction with migration operations performed using the distributed file system.

Figure 10:
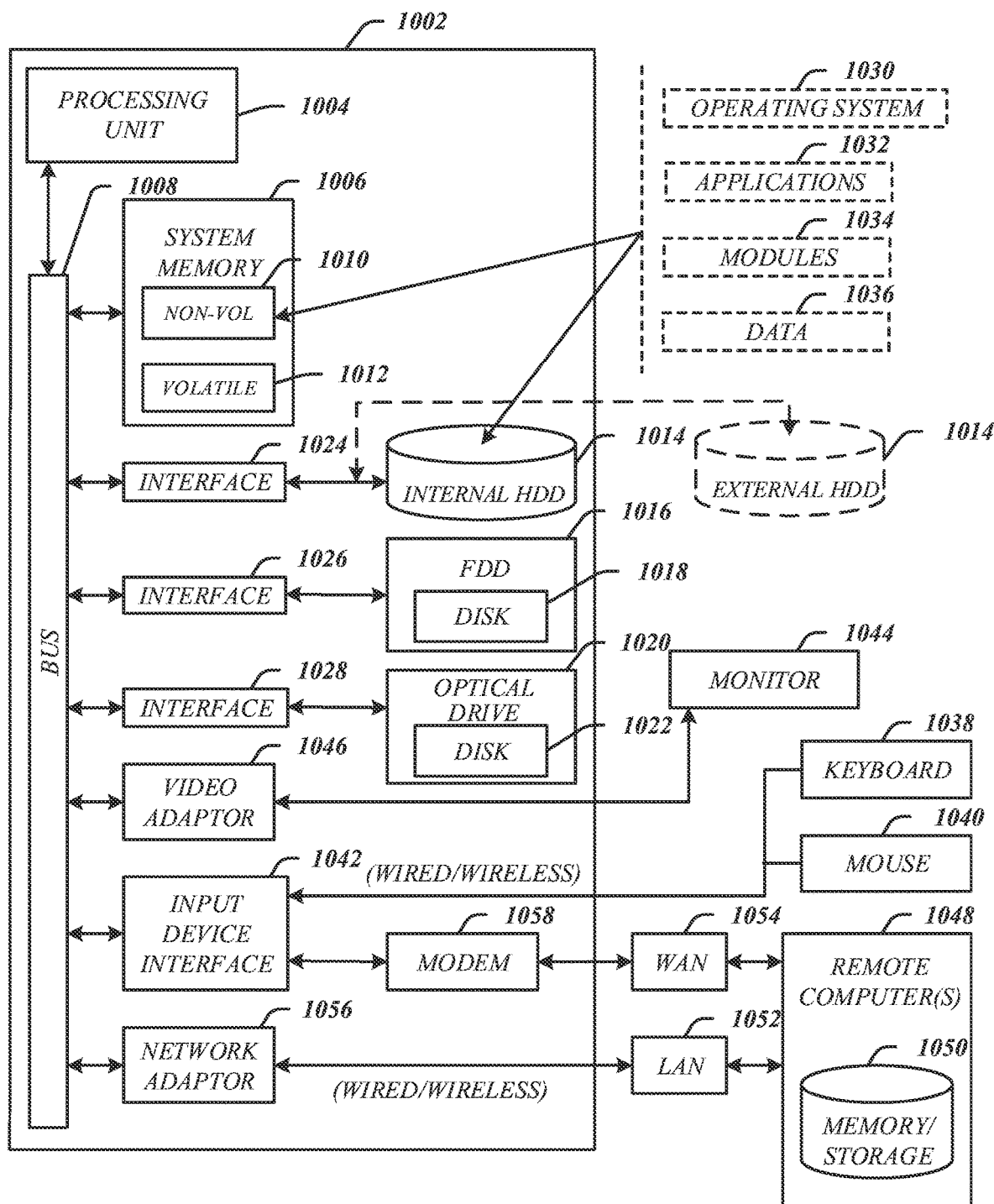
FIG. 10 illustrates an embodiment of a computing architecture.

FIG. 10 illustrates an embodiment of an exemplary computing architecture 1300 suitable for implementing various embodiments as previously described. In one embodiment, the computing architecture 1000 may comprise or be implemented as part of an electronic device. Examples of an electronic device may include those described with reference to FIGS. 8, 9, and 10 among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
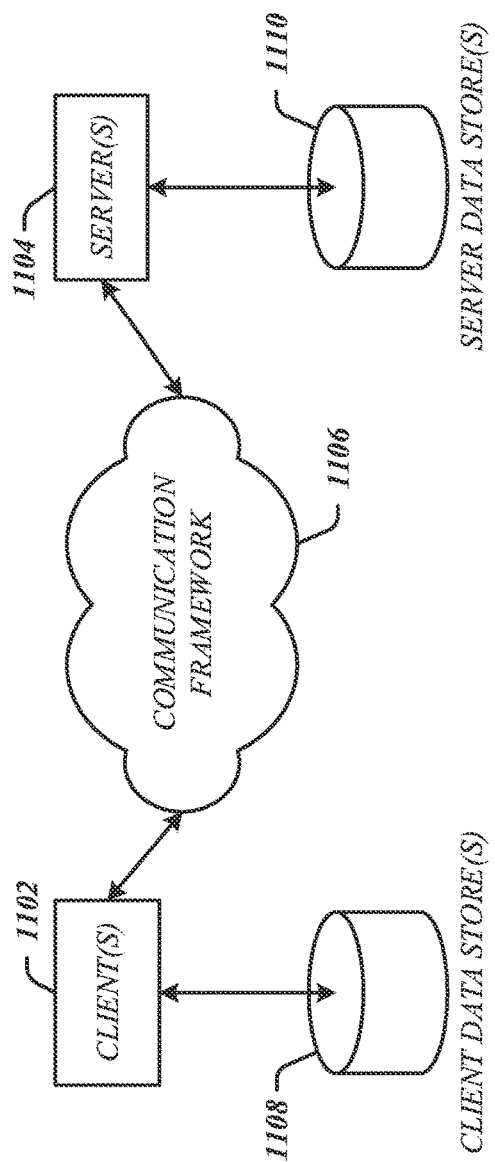
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 910. The servers 1104 may implement the server devices 2350/2370. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   determining performance states of nodes within a cluster;
   identifying healthy nodes having a healthy state and unhealthy nodes having an unhealthy state based upon the performance states;
   generating a list of new nodes to add to the cluster; and
   redistributing relationships of the unhealthy nodes to other nodes within the cluster, wherein the other nodes include at least one node selected from the list of new nodes.

2. The method of claim 1, comprising:
   utilizing a replicated database (RDB) ring of a current user space process to detect the unhealthy nodes.

3. The method of claim 1, comprising:
   reassigning the relationships to the nodes within the list of new nodes.

4. The method of claim 1, comprising:
   adding a node on the list of new nodes to the cluster.

5. The method of claim 4, comprising:
   determining whether the node added to the cluster is a most recent node responsible for a relationship.

6. The method of claim 1, comprising:
   reassigning idle relationships to the nodes within the list of new nodes.

7. The method of claim 1, comprising:
   restarting a task performed by a node within the cluster based upon occurrence of a failure condition of the node.

8. The method of claim 1, comprising:
   adding nodes on the list of new nodes to the cluster.

9. A computing device, comprising:
   a memory comprising instructions; and
   a processor coupled with the memory, the processor configured to execute the instructions to cause the processor to:
     determine performance states of nodes within a cluster;
     identify healthy nodes having a healthy state and unhealthy nodes having an unhealthy state based upon the performance states;
     generate a list of new nodes to add to the cluster; and
     redistribute relationships of the unhealthy nodes to other nodes within the cluster, wherein the other nodes include at least one node selected from the list of new nodes.

10. The computing device of claim 9, the instructions to cause the processor to:
    utilize a replicated database (RDB) ring of a current user space process to detect the unhealthy nodes.

11. The computing device of claim 9, the instructions to cause the processor to:
    reassign the relationships to the nodes within the list of new nodes.

12. The computing device of claim 9, the instructions to cause the processor to:
    add a node on the list of new nodes to the cluster.

13. The computing device of claim 12, the instructions to cause the processor to:
    determine whether the node added to the cluster is a most recent node responsible for a relationship.

14. The computing device of claim 9, the instructions to cause the processor to:
    reassign idle relationships to the nodes within the list of new nodes.

15. The computing device of claim 9, the instructions to cause the processor to:
    restart a task performed by a node within the cluster based upon occurrence of a failure condition of the node.

16. The computing device of claim 9, the instructions to cause the processor to:
    add nodes on the list of new nodes to the cluster.

17. A non-transitory computer-readable storage medium comprising instructions that, when executed by a processor, cause the processor to:
    determine performance states of nodes within a cluster;
    identify healthy nodes having a healthy state and unhealthy nodes having an unhealthy state based upon the performance states;
    generate a list of new nodes to add to the cluster; and
    redistribute relationships of the unhealthy nodes to other nodes within the cluster, wherein the other nodes include at least one node selected from the list of new nodes.

18. The non-transitory computer-readable storage medium of claim 17, the instructions to cause the processor to:
    utilize a replicated database (RDB) ring of a current user space process to detect the unhealthy nodes.

19. The non-transitory computer-readable storage medium of claim 17, the instructions to cause the processor to:
    reassign the relationships to the nodes within the list of new nodes.

20. The non-transitory computer-readable storage medium of claim 17, the instructions to cause the processor to:
    add a node on the list of new nodes to the cluster.

* * * * *